(12) United States Patent    (10) Patent No.:     US 8,438,149 B1
Dicker et al.                (45) Date of Patent:      May 7, 2013

(54) GENERATING NETWORK PAGES FOR SEARCH ENGINES

(75) Inventors: Russell A. Dicker, Seattle, WA (US); Logan Luyet Dillard, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 112 days.

(21) Appl. No.: 12/887,290

(22) Filed: Sep. 21, 2010

(51) Int. Cl.
*G06F 17/30* (2006.01)

(52) U.S. Cl.
USPC .......................................... 707/706; 707/707

(58) Field of Classification Search .................. 707/706, 707/707
See application file for complete search history.

(56) References Cited

U.S. PATENT DOCUMENTS

| | | | |
|---|---|---|---|
| 2006/0143158 A1* | 6/2006 | Ruhl et al. | 707/3 |
| 2011/0208669 A1* | 8/2011 | Ruhl et al. | 705/347 |
| 2012/0173327 A1* | 7/2012 | Dolph et al. | 705/14.46 |

* cited by examiner

*Primary Examiner* — Baoquoc N To
(74) *Attorney, Agent, or Firm* — Thomas | Horstemeyer, LLP

(57) ABSTRACT

Disclosed are various embodiments generating network pages for search engines from data protected from search engines. A portion of data from a corpus of data that is protected from indexing by a search engine is extracted. A first network page is generated based at least in part on the portion of data. The first network page is configured for the search engine to index the portion of data. The first network page omits a context for the portion of data from the corpus of data. The first network page includes one or more links to a second network page that is protected from indexing by the search engine. The second network page provides access to the corpus of data.

32 Claims, 4 Drawing Sheets

GENERATING NETWORK PAGES FOR SEARCH ENGINES

BACKGROUND

Search engines, such as Google® and Bing®, are searchable indexes or directories of network sites. Although links may be manually submitted, a search engine typically has a crawler application that follows links embedded in network pages in order to find, retrieve, and index other network pages. Usually, the owner of a network site considers it desirable to have the pages of the network site indexed by the search engine crawler to drive traffic to the network site. However, mechanisms such as the robot exclusion standard and hypertext markup language (HTML) elements such as the "nofollow" attribute value for links or the "noindex" tag for pages are available to site owners for excluding pages from crawling and/or indexing.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating network pages that are attractive to search engines while protecting a corpus of data. A network site may have a corpus of data that may be valuable for driving search traffic to the site. However, the owner of the network site may want to avoid having the entire corpus of data indexed and used by the search engine out of the control of the owner. Various embodiments of the present disclosure enable a network site owner to protect a corpus of data from indexing by the search engine while generating network pages that are attractive for indexing by the search engine based on the corpus of data. In the following discussion, a general description of the system and its components is provided, followed by a discussion of the operation of the same.

Figure 1:
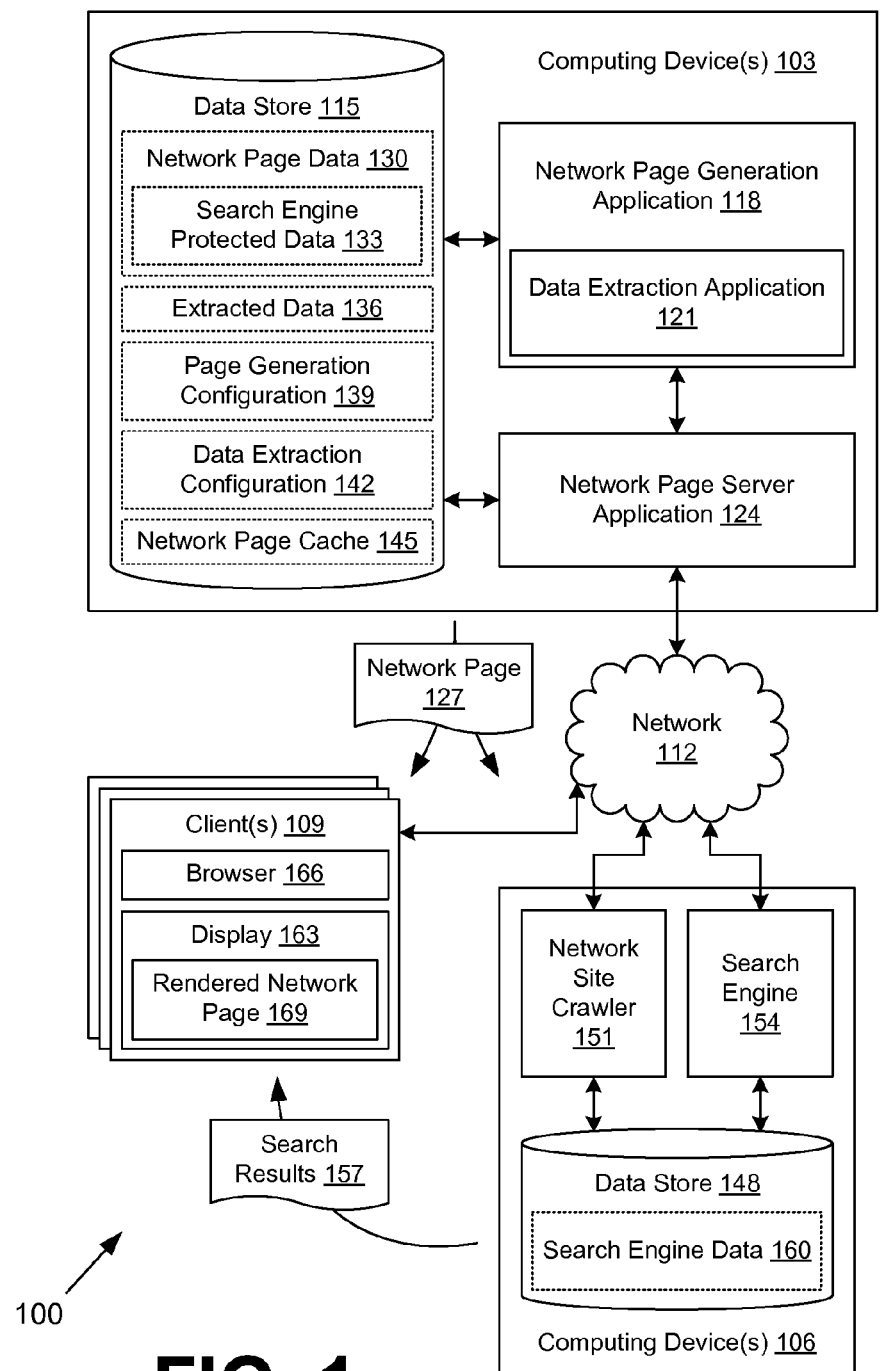
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a network page generation application 118, a data extraction application 121, a network page server application 124, and other applications, services, processes, systems, engines, or functionality not discussed in detail herein. The network page generation application 118 is executed to generate network pages 127, such as web pages, gopher pages, etc., based on a protected corpus of data, where the network pages 127 are attractive to search engines. The data extraction application 121, which may be implemented as a portion of the network page generation application 118, processes the corpus of data to extract portions that may be used for search engine optimization of the network pages 127 for the subject matter embodied in the corpus of data.

The network page server application 124 is executed to serve up the network pages 127 and other data. To this end, the network page server application 124 may comprise a commercially available hypertext transfer protocol (HTTP) server such as, for example, Apache® HTTP Server, Apache® Tomcat®, Microsoft® Internet Information Services, and/or other servers.

The data stored in the data store 115 includes, for example, network page data 130, search engine protected data 133, extracted data 136, a page generation configuration 139, a data extraction configuration 142, a network page cache 145, and potentially other data. The network page data 130 includes data used in generating the network pages 127, such as, for example, graphics, hypertext markup language (HTML), extensible markup language (XML), templates, code, audio, video, etc. In particular, the network page data 130 may include search engine protected data 133. The search engine protected data 133 corresponds to a corpus of data that is designated to be protected from indexing, caching, and other usage by search engines. Although the search engine protected data 133 is protected from certain usage by search engines, the search engine protected data 133 may be used in generating network pages 127 that provide access to the corpus of data for clients 109. In one embodiment, the search engine protected data 133 corresponds to customer reviews of items such as, for example, products, goods, services, digital downloads, and/or other types of items.

The extracted data 136 corresponds to data that is extracted from the search engine protected data 133 by the data extraction application 121. The extracted data 136 may be used by the network page generation application 118 in generating network pages 127 that are optimized for indexing by search engines. The extracted data 136 may correspond, for example, to keywords, topics of importance, quotations or portions of quotations, statistics, and/or other data. Although the extracted data 136 is depicted separately in the data store 115, it is understood that, in some embodiments, the extracted data 136 may be extracted from the search engine protected data 133 on demand and not separately stored within the data store 115.

The page generation configuration 139 contains parameters and settings related to the network page generation application 118. Such parameters and settings may configure how network pages 127 that are optimized for search engines are generated, how network pages 127 that are protected from search engines are generated, etc. The data extraction configuration 142 contains parameters and settings related to the data extraction application 121. Such parameters and settings may define what portions of data in the search engine protected data 133 may be extracted, what portions of data in the search engine protected data 133 may not be extracted, etc. The network page cache 145 may be used to cache network pages 127, or portions of network pages 127, that have been generated by the network page generation application 118.

The computing device 106, which is associated with one or more search engine providers, may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 148 that is accessible to the computing device 106. The data store 148 may be representative of a plurality of data stores 148 as can be appreciated. The data stored in the data store 148, for example, is associated with the operation of the various applications and/or functional entities described below.

The components executed on the computing device 106, for example, include a network site crawler 151, a search engine 154, and other applications, services, processes, systems, engines, or functionality not discussed in detail herein. The network site crawler 151 is executed to request network pages 127 from network sites and to process the network pages 127 for inclusion in an index or directory. To this end, the network site crawler 151 may be configured to follow links within a network page 127 to discover other network pages 127 available on the same network site or different network sites. Additionally, the network site crawler 151 may be configured to request and process network pages 127 that are submitted by users. The requesting and processing of the network pages 127 by the network site crawler 151 may be referred to as "web crawling" or "spidering."

The search engine 154 is executed to provide an interface for users to access an index or directory of network pages 127. To this end, a client 109 may supply a search query to the search engine 154, and the search engine 154 may return search results 157, which may take the form of a network page. The search results 157 may include a plurality of links to the various network pages 127 that match the search query. The search results 157 may be ranked according to an approach that is proprietary for the search engine 154. Such an approach may consider, for example, keyword density, markup surrounding keywords, number of links to the particular network page 127, and/or numerous other factors.

The data stored in the data store 148 includes, for example, search engine data 160 and potentially other data. The search engine data 160 corresponds to the directory, index, and/or cache maintained by the network site crawler 151 and the search engine 154. The network site crawler 151 is configured to add data to the search engine data 160, and the search engine 154 is configured to search through the data stored in the search engine data 160 to generate the search results 157.

The client 109 is representative of a plurality of client devices that may be coupled to the network 112. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 109 may also include a display 163. The display 163 may comprise, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a browser 166 and/or other applications. The browser 166 may be executed in a client 109, for example, to access and render network pages 127, search results 157, and/or other network content served up by the computing devices 103, 106 and/or other servers, thereby generating a rendered network page 169 on the display 163. The client 109 may be configured to execute applications beyond the browser 166 such as, for example, email applications, instant message applications, and/or other applications.

Next, a general description of the operation of the various components of the networked environment 100 is provided. To begin, the data extraction application 121 processes the corpus of data stored in the search engine protected data 133 to extract a portion of data. The extracted data 136, which may be referred to as an abridgment of the corpus of data, is used in generating a network page 127 that is designed to be attractive for indexing by network site crawlers 151 associated with search engines 154.

In particular, significant keywords, potential search terms, statistics, topics of importance, and/or other information may be extracted from the search engine protected data 133. Techniques such as latent Dirichlet allocation may be employed by the data extraction application 121 in producing topics of importance and other information distilled from the search engine protected data 133. Sentences or words from the search engine protected data 133 may be clustered into topics, and of the most common topics, keywords may be extracted as being most representative.

A statistical analysis of keywords in the search engine protected data 133 may be employed to determine frequently used or important keywords. As a non-limiting example, a term frequency-inverse document frequency (tf-idf) approach may be employed to determine the relative importance of a keyword to a document in the search engine protected data 133. Where the search engine protected data 133 corresponds to customer reviews, a document could be defined as, for example, a single review, all the reviews for an item, all of the reviews for a category of items, all the reviews by a customer, etc. Keywords may also be compared to baseline text for the language to determine whether they are representative. In one embodiment, statistically improbable phrases may be extracted. A collection of popular search terms, such as search terms that users have previously used in locating the network page 127 or other network pages 127, may be used in determining which keywords are important.

The network page generation application 118 generates a network page 127 from the extracted data 136 that is intended to be optimized for driving search traffic to the network site. Many different techniques may be employed for search engine optimization (SEO), such as repeating significant keywords, using "meta" tags to describe the content of a network page 127, enclosing significant keywords within an "H1" tag, including links to other network pages 127, and so on. In one embodiment, different SEO techniques may be employed for network pages 127 generated from the same extracted data 136 for targeting different search engines 154. The network page 127 omits a context for the extracted data 136 from the search engine protected data 133, thereby protecting the corpus of data in the search engine protected data 133 from indiscriminate use by the search engine 154. The corpus of data may be a valuable asset to the owner of the network site, which may lead the owner to want to protect it from unauthorized usage.

Although a network page 127 may be optimized for the network site crawler 151, the network page 127 may be intended for presentation to users at clients 109. In other words, in various embodiments, the network page 127 is generated irrespective of whether the network page 127 has been requested by a network site crawler 151 associated with a search engine 154. To this end, the network page 127 may comprise, for example, a doorway network page 127, a gateway network page 127, a bridge network page 127, or another type of network page 127. In other words, the network page 127 may serve as an introduction or a summary for the content of the search engine protected data 133 for human users.

The network page 127 that is intended to be attractive to network site crawlers 151 may include one or more links to other network pages 127 that provide access to the corpus of data in the search engine protected data 133 for users other than network site crawlers 151. To protect the other network pages 127 from indexing or other use by network site crawlers 151, the links to the other network pages 127 may be designated with "rel=nofollow" or a similar attribute. Alternatively, or additionally, the other network pages 127 may be listed within a file such as, for example, "robots.txt" in the root directory of the network site according to the robot exclusion standard. Alternatively, or additionally, the other network pages 127 may include a "noindex" tag. Although such approaches may protect the other network pages 127 from being indexed or spidered by most network site crawlers 151, such approaches may not be effective against network site crawlers 151 that ignore such standards.

As an alternative, the network page generation application 118 and/or the network page server application 124 may be configured to deny access to the other network pages 127 by non-human users, such as network site crawlers 151. To this end, the network page generation application 118 may include challenge-response tests, such as, for example, captchas, etc., to provide access to the other network pages 127 that include the search engine protected data 133. Denial of access may also be made based on an internet protocol (IP) address, a referrer field, a user agent field, and/or other fields associated with a request for a network page 127 received by the network page server application 124. In some embodiments, users may authenticate with the network page server application 124 before being granted access to the other network pages 127.

In order to promote the network page 127 to search engines 154, links may be included on other network pages 127, such as, for example, detail network pages 127 for an item, of the same network site or other network sites. Such links may be included for the purpose of increasing the page rank of the network page 127 in the search engine 154. It may be the case that network pages 127 that are not referred to by other network pages 127 may be penalized according to the ranking approach of the search engine 154. In various situations, it may be undesirable to highlight such a network page 127 to users versus a network page 127 that provides direct access to the corpus of data. Therefore, the prominence of such links may vary.

In various embodiments, the network page generation application 118 may be configured to generate multiple different network pages 127 based on the search engine protected data 133. As a non-limiting example, where the search engine protected data 133 corresponds to customer reviews, the network page generation application 118 may be configured to generate a network page 127 for each distinct customer review. As another non-limiting example, the data extraction application 121 may be configured to generate different forms of extracted data 136 from the search engine protected data 133. In such an example, each form of extracted data 136 may be used to generate different network pages 127. As yet another non-limiting example, the network page generation application 118 may be configured to generate multiple different network pages 127 using the same extracted data 136. In one embodiment, if a plurality of significant keywords are extracted, a separate network page 127 may be generated to emphasize each respective one of the significant keywords.

Figure 2:
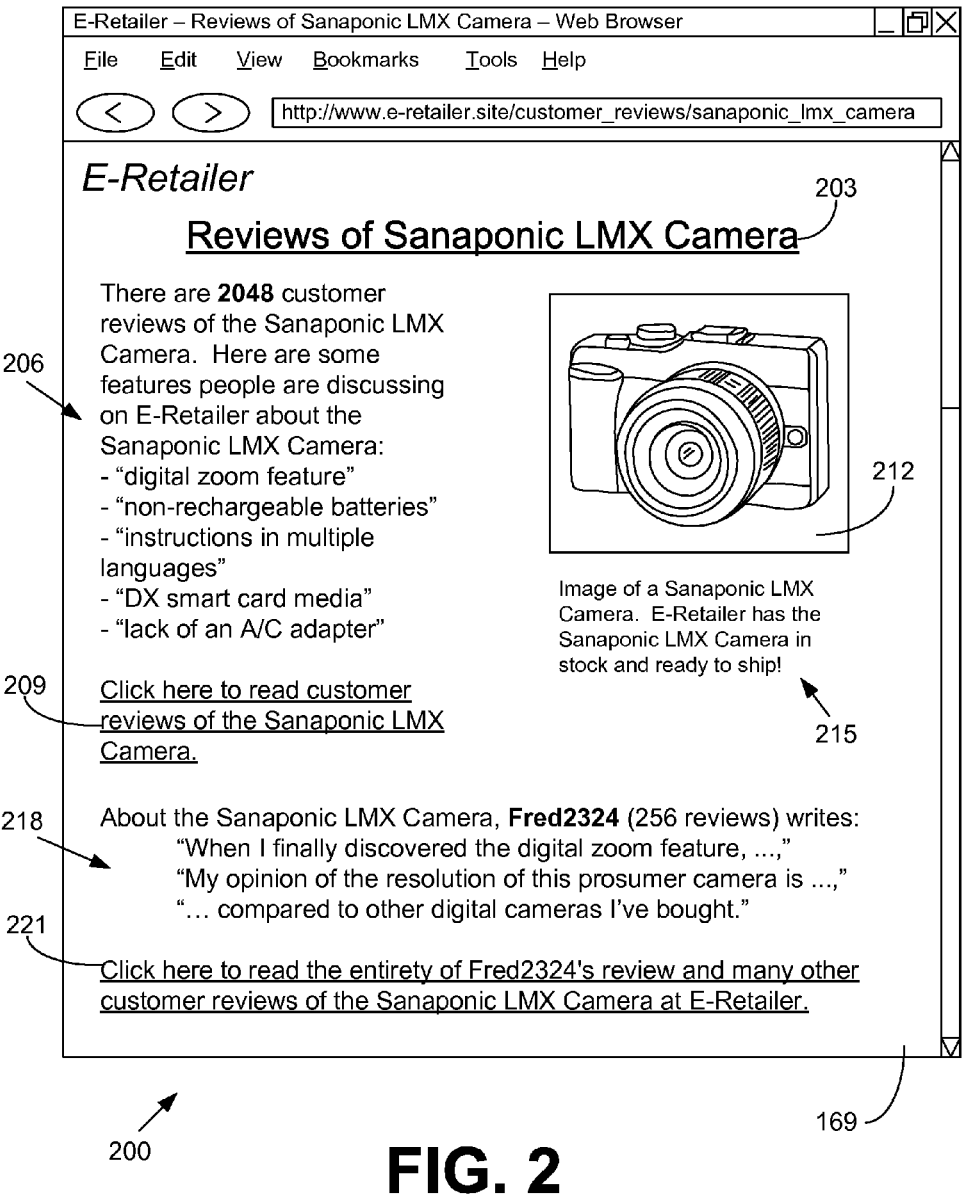
FIG. 2 is a drawing of an example of a user interface rendered by a client in the networked environment of FIG. 1 according to various embodiments of the present disclosure.

Turning now to FIG. 2, shown is one example of a user interface 200 rendered in a client 109 (FIG. 1) in the networked environment 100 (FIG. 1). In particular, FIG. 2 depicts a rendered network page 169 that is rendered in a browser 166 (FIG. 1) according to one embodiment of the present disclosure. The rendered network page 169 is generated by the network page generation application 118 (FIG. 1) to be optimized for indexing by a network site crawler 151 (FIG. 1) and inclusion in a search engine 154 (FIG. 1). The rendered network page 169 includes data extracted from a corpus of data in the search engine protected data 133 (FIG. 1). In this non-limiting example, the corpus of data corresponds to customer reviews associated with an item, which is a camera having a title of "Sanaponic LMX Camera." It is understood that the principles of the present disclosure are also applicable to other forms of data corpora, such as books, news articles, journals, bulletin board postings, blogs, and so on.

The rendered network page 169 includes various features that are intended to be attractive for network site crawlers 151. To begin with, the page title 203 includes the title of the item and may be within first-level heading markup. A summary section 206 provides statistics and topics of importance extracted from the corpus of data. For instance, the summary section 206 provides a statistic as to how many customer reviews of the item are in the corpus of data. The summary section 206 also includes topics that may be often discussed in the customer reviews, thereby providing a rich source of relevant keywords for a search engine 154. Within the summary section 206, the title of the item may be used in order to promote the title as a potential search term for the search engine 154.

A first link 209 may be provided for a human user to access another network page 127 (FIG. 1) that provides access to the corpus of data, i.e., the customer reviews for the item. The first link 209 may include the title of the item and/or other keywords. The first link 209 may be marked, for example, with the "nofollow" attribute to protect the network page 127 at the corresponding address from crawling.

An item image 212 and image caption 215 may be included in the rendered network page 169. The item image 212 helps to describe the customer reviews without disclosing the content of the customer reviews. The image caption 215 and the alternate text for the item image 212 may promote various keywords to the search engine 154 as desired.

The rendered network page 169 may include one or more review excerpts 218 extracted from the corpus of data. The review excerpts 218 may indicate a user associated with the review excerpts 218 and statistics associated with the user. The review excerpts 218 may include quotations from the customer reviews that appear to be significant. The review excerpts 218, in some embodiments, may be selected in order not to reveal a sentiment associated with the customer review.

To illustrate, the quotation examples in the review excerpts 218 do not reveal the conclusion or sentiment of the customer review. Alternatively, the review excerpts 218 may be seen as expressing a neutral sentiment. First, "[w]hen I finally discovered the digital zoom feature" discloses that the camera has a digital zoom feature but does not reveal the sentiment of the customer in regard to the digital zoom feature. Second, "[m]y opinion of the resolution of this prosumer camera is . . . ." discloses that the customer has an opinion regarding the resolution but does not disclose what that opinion is. The review excerpts 218, therefore, serve as "teasers" for the full customer reviews available to human users via the linked network page 127. Third, " . . . compared to other digital cameras I've bought" indicates a comparison is included in the review but omits the details of the comparison. Further, the review excerpts 218 supply additional content and keywords for SEO purposes without providing the entire review or reviews. Although the rendered network page 169 omits the sentiment of particular customer reviews, the rendered network page 169 may include expressions of overall customer sentiment in various embodiments.

A second link 221 and additional links to the other network page 127 may be provided for the convenience of human users. The second link 221 may, for example, be a direct link to a particular customer review highlighted in the review excerpts 218. The text associated with the second link 221 may be configured to include targeted keywords and/or other text selected to exhort human users to click through. Other links may also be provided within the rendered network page 169. For example, the page title 203 may comprise a link to the other network page 127 that is protected from crawling. One goal may be to make it as easy as possible for a human user to navigate from the rendered network page 169 to the other network page 127 that contains the actual customer reviews and/or other information. To this end, the rendered network page 169 may be configured such that, for example, a click anywhere in the rendered network page 169 may load the other network page 127.

Figure 3:
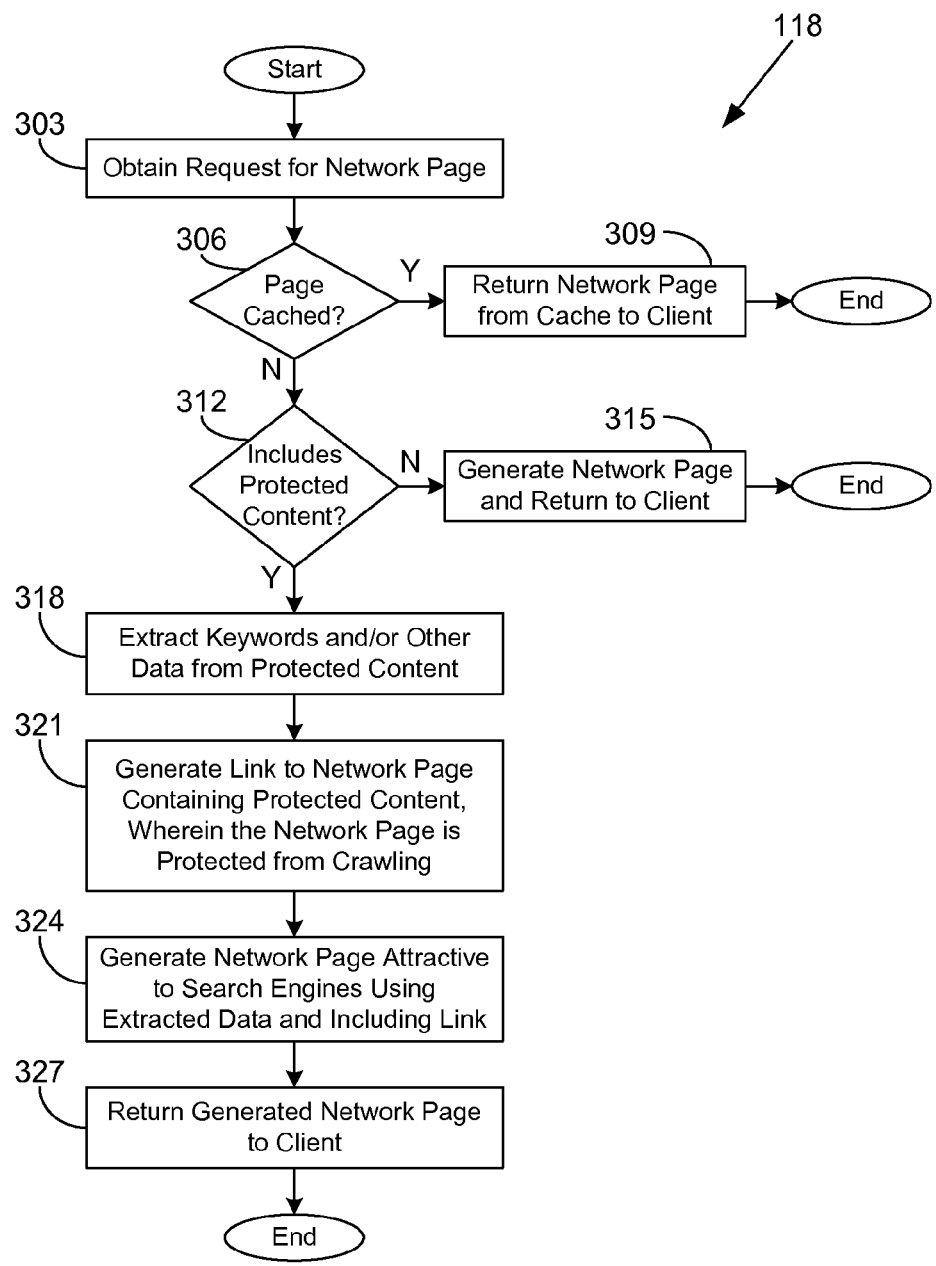
FIG. 3 is a flowchart illustrating one example of functionality implemented as portions of a network page generation application executed in a computing device in the networked environment of FIG. 1 according to various embodiments of the present disclosure.

Referring next to FIG. 3, shown is a flowchart that provides one example of the operation of a portion of the network page generation application 118 according to various embodiments. In some embodiments, portions of the flowchart of FIG. 3 may be implemented by the data extraction application 121. It is understood that the flowchart of FIG. 3 provides merely an example of the many different types of functional arrangements that may be employed to implement the operation of the portion of the network page generation application 118 as described herein. As an alternative, the flowchart of FIG. 3 may be viewed as depicting an example of steps of a method implemented in the computing device 103 (FIG. 1) according to one or more embodiments.

Beginning with box 303, the network page generation application 118 obtains a request for a network page 127 (FIG. 1). Such a request may originate from a client 109 (FIG. 1), a computing device 106 (FIG. 1), or another system. In box 306, the network page generation application 118 determines whether the requested network page 127 is cached in the network page cache 145 (FIG. 1). If the network page 127 is cached, the network page generation application 118 proceeds to box 309 and returns the network page 127 from the network page cache 145 to the client 109 or other requester. Thereafter, the portion of the network page generation application 118 ends.

If the requested network page 127 is not cached, the network page generation application 118 moves to box 312 and determines whether the requested network page 127 includes or relates to content protected from indexing by a network site crawler 151 (FIG. 1) associated with a search engine 154 (FIG. 1). If the network page 127 does not include or relate to protected content, the network page generation application 118 proceeds to box 315 and generates the network page 127 and returns the network page 127 to the client 109 or other requester. Thereafter, the portion of the network page generation application 118 ends.

If the network page generation application 118 determines in box 312 that the requested network page 127 is to include or relate to protected content, the network page generation application 118 transitions to box 318 and extracts keywords and/or other data from the protected content. In one embodiment, the task of box 318 is performed by the data extraction application 121 (FIG. 1). The extracted data 136 (FIG. 1) that is obtained excludes a context associated with the protected data. In various embodiments, the excluded context corresponds to a customer sentiment expressed in a customer review, a customer rating included in a customer review, any adjectives, any words that are not nouns, a quantity of customer reviews, and other forms of context. In various embodiments, the extracted data 136 may be said to include data that expresses a neutral customer sentiment.

Next, in box 321, the network page generation application 118 generates a link to another network page 127 containing, or providing access to, the protected content. The other network page 127, unlike the requested network page 127, is protected from crawling by the network site crawler 151. In one embodiment, the link may contain a "nofollow" attribute to inhibit or discourage crawling. In one embodiment, the other network page 127 may be generated by the network page generation application 118 in box 321. In other embodiments, the other network page 127 may be generated as part of a batch process or in response to a request for the other network page 127.

In box 324, the network page generation application 118 generates the requested network page 127 that is intended to be attractive to search engines 154. The network page generation application 118 uses the extracted data 136 in generating the network page 127. The keywords, topics of importance, and other data in the extracted data 136 may be emphasized within the network page 127 according to search engine optimization (SEO) techniques. The extracted data 136 may also be used to determine one or more statistics to be included in the network page 127. The network page 127 includes the link generated in box 321 so that human users may access the corpus of data corresponding to the protected content. In box 327, the network page generation application 118 returns the generated network page 127 to the client 109 or other requester. Thereafter, the portion of the network page generation application 118 ends.

Although the flowchart of FIG. 3 relates to the generation of a network page 127 that would otherwise contain protected content in response to a request, in another embodiment, the network page 127 is generated as part of a batch process and not in response to a request for the network page 127. In one embodiment, the generation of the network pages 127 may be manually configured so as to use the extracted data 136 and not the search engine protected data 133 (FIG. 1).

Figure 4:
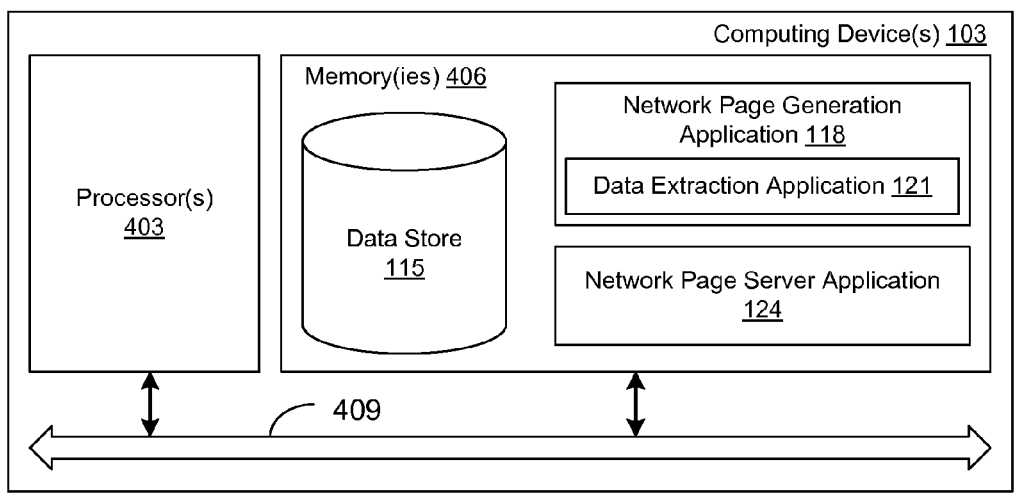
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network page generation application 118, the data extraction application 121, the network page server application 124, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 112 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network page generation application 118, the data extraction application 121, the network page server application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the network page generation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 118, the data extraction application 121, and the network page server application 124, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that extracts a portion of data from a collection of customer reviews for a product, the portion of data including a set of potential search terms, the collection of customer reviews being protected from crawling by a network site crawler;
    code that determines at least one statistic from the portion of data; and
    code that generates a gateway network page for the customer reviews based in part on the portion of data, the gateway network page omitting a respective sentiment associated with each of the customer reviews, the gateway network page being configured to promote the potential search terms for indexing by the network site crawler, the gateway network page including the at least one statistic and at least one link to a network page that provides access to the customer reviews, the network page being protected from crawling by the network site crawler.

2. The non-transitory computer-readable medium of claim 1, wherein the program further comprises code that caches the gateway network page.

3. The non-transitory computer-readable medium of claim 1, further comprising:
    code that obtains a request for the gateway network page from a client; and
    code that sends the gateway network page to the client.

4. A system, comprising:
    at least one computing device; and
    a network page generation application executable in the at least one computing device, the network page generation application comprising:
        logic that extracts a portion of data from a corpus of data that is protected from crawling by a network site crawler; and
        logic that generates a first network page based at least in part on the portion of data, the first network page being configured for the network site crawler to index the portion of data, the first network page omitting a context for the portion of data from the corpus of data, the first network page including at least one link to a second network page that is protected from crawling by the network site crawler, the second network page providing access to the corpus of data.

5. The system of claim 4, wherein the context omitted for the portion of data is selected from the group consisting of: a customer sentiment, a customer rating, a quantity of customer reviews, a set of non-nouns, and a set of adjectives.

6. The system of claim 4, wherein the at least one link includes a nofollow attribute.

7. The system of claim 4, wherein the second network page is protected from indexing by the network site crawler according to the robot exclusion standard.

8. The system of claim 4, wherein the second network page includes a noindex attribute.

9. The system of claim 4, wherein the portion of data comprises a plurality of keywords.

10. The system of claim 9, wherein the first network page is configured to promote at least a subset of the keywords as a plurality of potential search terms to a search engine associated with the network site crawler.

11. The system of claim 4, wherein the first network page is generated irrespective of whether the first network page has been requested by the network site crawler.

12. The system of claim 4, wherein the portion of data comprises a plurality of topics of importance.

13. The system of claim 12, wherein the logic that extracts the portion of data is configured to identify the topics of importance based at least in part on a latent Dirichlet allocation.

14. The system of claim 4, wherein the corpus of data comprises a plurality of customer reviews for an item.

15. The system of claim 14, wherein the context corresponds to customer sentiment.

16. The system of claim 14, wherein the first network page provides a summary of the customer reviews.

17. A method, comprising the steps of:
    determining, in at least one computing device, a plurality of significant keywords within a data corpus regarding an item; and
    generating, in the at least one computing device, a first network page that provides an abridgment of the data corpus for indexing by a search engine, the abridgment omitting at least one customer sentiment expressed in the data corpus regarding the item, the first network page being configured to emphasize the significant keywords for indexing by the search engine, the first network page including at least one link to a second network page that provides access to the data corpus, the second network page being protected from indexing by the search engine.

18. The method of claim 17, wherein the significant keywords are determined using a latent Dirichlet allocation.

19. The method of claim 17, wherein the significant keywords are determined using a term frequency-inverse document frequency (tf-idf) approach.

20. The method of claim 17, wherein the significant keywords are determined based at least in part on a collection of popular search terms.

21. The method of claim 17, further comprising the step of generating, in the at least one computing device, a third network page that provides a different abridgment of the data corpus for indexing by the search engine, the third network page including at least one link to the second network page.

22. The method of claim 17, wherein the data corpus comprises a plurality of customer reviews of the item.

23. The method of claim 22, further comprising the steps of:
  extracting, in the at least one computing device, a quotation from one of the customer reviews;
  excluding, in the at least one computing device, a sentiment of the one of the customer reviews from the quotation, thereby producing a non-excluded portion of the quotation; and
  featuring, in the at least one computing device, the non-excluded portion of the quotation as a representative quotation for the customer reviews on the first network page.

24. The method of claim 17, further comprising the step of providing, in the at least one computing device, the second network page to an unauthenticated client.

25. The method of claim 17, further comprising the step of providing, in the at least one computing device, the second network page to a client in response to determining that the client is associated with a human user.

26. The method of claim 17, wherein each of the at least one customer sentiment that is omitted from the abridgement corresponds to an opinion of a respective customer regarding the item, and the second network page includes the opinion of the respective customer.

27. A system, comprising:
  at least one computing device; and
  a network page generation application executable in the at least one computing device, the network page generation application comprising:
    logic that extracts a portion of data from a corpus of data regarding an item, the corpus of data being protected from crawling by a network site crawler, the portion of data expressing a neutral sentiment regarding the item; and
    logic that generates a first network page based at least in part on the portion of data, the first network page being configured for the network site crawler to index the portion of data, the first network page including at least one link to a second network page that is protected from crawling by the network site crawler, the second network page providing access to the corpus of data.

28. The system of claim 27, wherein the logic that generates is further configured to generate a plurality of first network pages based at least in part on the portion of data, and each of the first network pages is different.

29. The system of claim 27, wherein the portion of data includes at least one quotation from a customer review of the item that expresses the neutral sentiment.

30. The system of claim 27, wherein the portion of data consists of a plurality of non-adjective keywords.

31. The system of claim 27, wherein the portion of data includes a plurality of keywords selected using a term frequency-inverse document frequency (tf-idf) approach.

32. The system of claim 27, wherein the corpus of data includes a non-neutral sentiment regarding the item, and the portion of data excludes the non-neutral sentiment.

* * * * *